United States Patent [19]

L'Heureux

[11] Patent Number: 5,004,115
[45] Date of Patent: Apr. 2, 1991

[54] ACOUSTICALLY INSULATING ELECTRICAL BOX

[76] Inventor: Ghislain L'Heureux, 911, Rang St-Antoine, St Féréol Les Neiges, (Quebec), Canada, G0A 3R0

[21] Appl. No.: 342,909
[22] Filed: Apr. 25, 1989
[51] Int. Cl.$^5$ .............................................. H02G 3/08
[52] U.S. Cl. ....................................... 220/3.3; 220/3.5
[58] Field of Search ........................... 220/3.3, 3.5, 3.9

[56] References Cited

U.S. PATENT DOCUMENTS

| | | | |
|---|---|---|---|
| 2,000,851 | 5/1935 | Knell | 220/3.2 |
| 2,329,109 | 9/1943 | Despard | 220/3.2 |
| 3,585,273 | 6/1971 | Paul | 220/3.2 X |
| 3,620,404 | 11/1971 | Grasso | 220/3.7 X |
| 3,633,782 | 1/1972 | Bellinger | 220/3.5 |
| 3,837,521 | 9/1974 | Huston et al. | 220/3.3 |
| 4,158,420 | 6/1979 | Balkwill et al. | 220/3.3 |
| 4,163,501 | 8/1979 | Lass | 220/3.9 X |
| 4,265,365 | 5/1981 | Boteler | 220/3.3 |
| 4,296,870 | 10/1981 | Balkwill et al. | 220/3.3 |
| 4,345,693 | 8/1982 | Balkwill et al. | 220/3.3 |
| 4,673,097 | 6/1987 | Schuldt | 220/3.2 X |
| 4,685,581 | 8/1987 | Kaneda et al. | 220/3.2 |
| 4,794,207 | 12/1988 | Norberg et al. | 220/3.3 X |

Primary Examiner—Steven M. Pollard
Attorney, Agent, or Firm—Bacon & Thomas

[57] ABSTRACT

An acoustically insulating electrical box made of plastic material comprises a box-like wall structure with an open face. A planar, outward flange is integral with the box-like structure around all of the open face. A building, wall or ceiling board is provided with an opening therein to receive the box-like structure with the back of the flange facing the front of the board. Fasteners attach the flange directly on the board with a silicone sealant pressed between the back of the flange and the front of the board. The box-like structure includes apertures through which electrically conducting wires enter the electrical box and which are also sealed with silicone, the box-like structure being otherwise non perforated.

12 Claims, 1 Drawing Sheet

ACOUSTICALLY INSULATING ELECTRICAL BOX

BACKGROUND OF THE INVENTION

1. Field of the invention

The present invention relates to an acoustically insulating electrical box in particular but not exclusively of the type designed to receive a conventional, domestic A.C. switch or outlet. The invention also relates to a method of acoustically insulating an electrical box of the above type.

2. Brief description of the prior art

U.S. Pat. No. 4,296,870 issued on Oct. 27, 1981 to BALKWILL et AL proposes a cover for a metallic electrical box mounted in an opening cut in a building wall or ceiling board. This cover, made of plastic material, extends around all of the electrical box except the open face thereof and is provided with a slanted flange which contacts and seals against the back surface of the wall or ceiling board. The function of the cover of BALKWILL et AL is to prevent passage of air and moisture through and around the electrical box. It is not mentioned in U.S. Pat. No. 4,296,870 that the plastic cover acoustically insulates the electrical box.

It is very questionable as to whether the slanted flange of BALKWILL et AL produces sufficient pressure on the back of the board to result into a joint impervious to aerial acoustic waves. In any case, it is very important that a constant, sufficient pressure be applied by the flange on the back of the board around all of the open face of the box. This accordingly results in a tedious, time consuming and therefore costly installation of the covers of BALKWILL et AL.

BALKWILL et AL further propose to attach the electrical box on the stud structure by means of nails drived through the box cover. These nails cancel any acoustic insulation effect produced by the slanted flange applied on the back surface of the wall or ceiling board as they cause an opening in the cover allowing passage of acoustic waves. Moreover, the nails establish an acoustic short circuit between the electrical box and the stud structure allowing transmission of acoustic vibrations from the box to the stud structure and of course from the stud structure to the box.

When the metallic, electrical box is nailed on a vertical stud through the cover of BALKWILL et AL, any twisting in the stud causes lack of parallelism between the cover flange and the board, variation in the pressure applied by the flange on the back surface of the board and accordingly a deficiency in the joint between these flange and board.

BALKWILL et AL further suggest mounting of a plurality of metallic, electrical boxes through a pair of metallic straps again nailed to the stud structure. A plastic cover for such a box assembly is provided with slots to allow passage of the straps. Again, the joint between the metallic straps and the plastic material of the cover is not tight enough to stop aerial acoustic waves. Again, the mounting straps, made of metal, cause an acoustic short circuit between the metal of the electrical boxes and the stud structure whereby acoustic vibrations are transmitted through these straps from the stud structure to the electrical boxes, and vice versa.

OBJECT OF THE INVENTION

The main object of the present invention is to provide an acoustically insulating electrical box, and a method of acoustically insulating an electrical box, which overcome the above discussed drawbacks of the prior art.

SUMMARY OF THE INVENTION

More specifically, the present invention is concerned with the combination with a planar, building wall or ceiling board having an opening therein, of an acoustically insulating electrical box comprising (a) a box-like wall structure with an open face and comprising at least one aperture through which electrically conducting wires enter the electrical box, which wall structure being otherwise non perforated, (b) means for attaching these wires to the box-like wall structure, (c) means for sealing the above-mentioned aperture of the box-like wall structure with the electrically conducting wires therein to prevent transmission of acoustic waves through the aperture of this box-like wall structure, and (d) a planar flange around all of the open face of the box-like wall structure, the improvement therein comprising fastener means for attaching the electrical box directly on the board with the flange and board overlapping each other around all of the board opening and with a sealing compound pressed between the box flange and the board around all of the board opening, whereby the sealing compound forms an acoustic wave-tight joint between these flange and board.

In accordance with a preferred embodiment of the combination according to the invention, the wall or ceiling board comprises a front surface, the flange is an outward flange and has a back surface, the board opening is dimensioned to receive the box-like wall structure with the flange, back surface facing the board, front surface, the fastener means comprises a plurality of fasteners U-shaped in cross section and each defining two leg members with respective, coaxial holes, each U-shaped fastener is positioned on a corresponding edge of the board opening with the leg members thereof on opposite sides of this board, and the fastener means further comprises screws each drived through the box flange, the wall or ceiling board and the coaxial holes of a corresponding one of the U-shaped fasteners, in order to fixedly attach the electrical box to the board while pressing the sealing compound between the flange, back surface and the board, front surface.

In accordance with the invention, there is also provided a method of acoustically insulating an electrical box while mounting it on a building, wall or ceiling board with an opening therein, which electrical box comprising (a) a box-like wall structure with an open face and comprising at least one aperture through which electrically conducting wires enter the electrical box, said wall structure being otherwise non perforated, (b) means for attaching the said wires to the box-like wall structure, and (c) a planar flange around all of the open face of the box-like wall structure, the said acoustically insulating method comprising the steps of:

overlapping the said flange with the wall or ceiling board around all of the board opening and applying a sealing compound between the flange and board again around all of the board opening;

fastening the electrical box directly on the said board while pressing the sealing compound between the flange and board whereby the said sealing compound forms an acoustic wave-tight joint between these flange and board; and sealing the said at least one aperture of the box-like wall structure of the electrical box with the electrically conducting wires therein to prevent transmission of acoustic waves through the said aperture.

Preferably, the aperture sealing step comprises applying a sealing compound, advantageously including silicone, in the aperture of the box-like wall structure.

The sealing compound produces between the flange and board a joint tight to aerial acoustic waves, without particular attention during the on-site installation of the electrical box.

As the electrical box is not directly attached to the stud structure, there exists no direct short circuit between these box and stud structure.

The aperture through which the electrical wires access the interior of the electrical box being sealed with a sealing compound, the box-like wall structure comprises no perforation through which aerial acoustic waves can traverse the wall structure of the electrical box.

The objects, advantages and other features of the present invention will become more apparent upon reading of the following non restrictive description of a preferred embodiment thereof, given in conjunction with the accompanying drawings.

DETAILED DESCRIPTION OF THE PREFERRED EMBODIMENT

Figure 1:
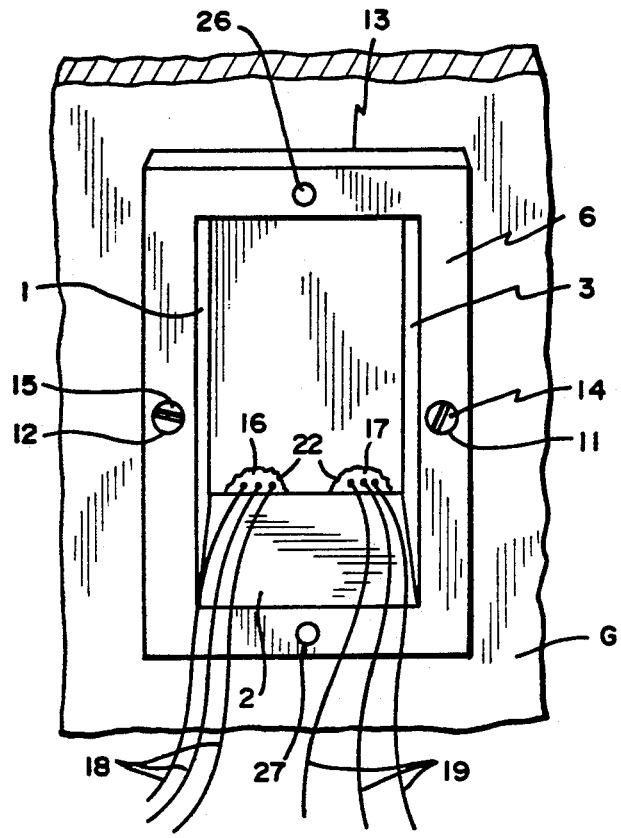
FIG. 1 is a front, perspective view of an electrical box in accordance with the present invention mounted in an opening through a building wall or ceiling board, namely a board of gypsum.
Figure 3:
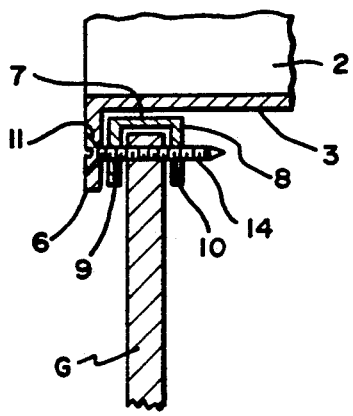
FIG. 3 is a partial cross-sectional view of the box of FIGS. 1 and 2, showing a U-shaped fastener used to fix the electrical box on the board of gypsum.
Figure 2:
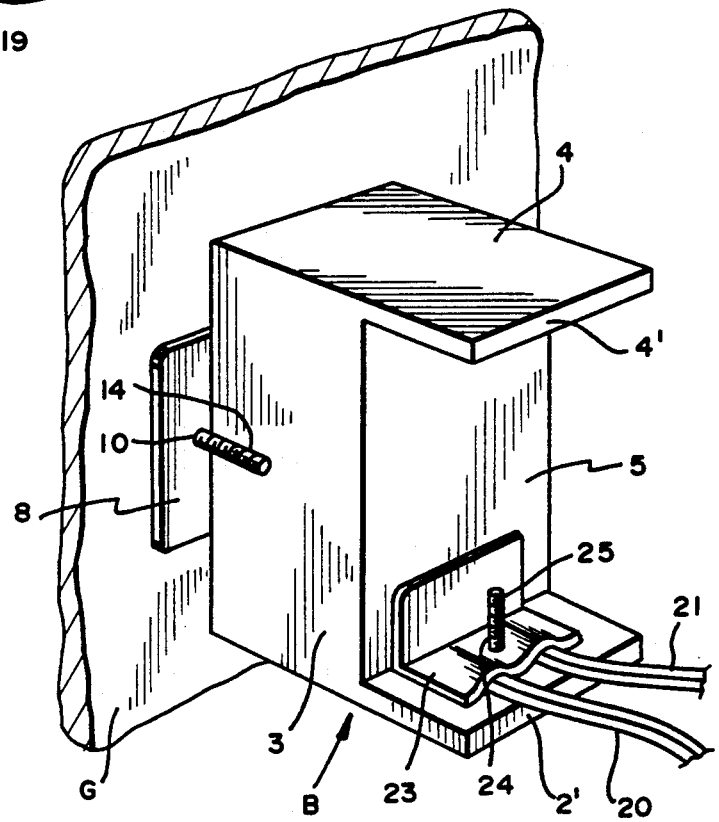
FIG. 2 is a rear, perspective view of the electrical box of FIG. 1.

As illustrated in FIGS. 1 to 3, the electrical box generally identified by the reference B is under the form of a hollow rectangular parallelepiped box-like wall structure having five walls 1, 2, 3, 4 and 5. It should be pointed out here that in the present disclosure and the appended claims, the term "box-like wall structure" includes the walls such as 1 to 5 but excludes the backward wall extensions such as 2' and 4' described hereinafter. Four of the above walls, namely the walls 1 to 4, have adjacent edges defining an open face of the box B. An outward, planar flange 6 perpendicular to the walls 1 to 4 and attached to the edges thereof surrounds the open face. The box-like wall structure 1-5 and the flange 6 form an integral one piece structure and flange advantageously made of rigid plastic material and manufactured through a molding process.

In order to mount the electrical box B on a board G, for example of gypsum, the following procedure is followed. The board G can be any building wall or ceiling board.

First of all, a rectangular opening 7 is cut through the board G. The rectangular opening 7 is dimensioned to receive the box-like wall structure therein, with the back of the flange 6 resting on the front of the board G around all of the opening 7.

Two fasteners such as 8, U-shaped in cross section, are disposed on two opposite edges of the opening 7 as shown in FIG. 3. As can be appreciated, the U-shaped fasteners 8 are advantageously so dimensioned as to squeeze the gypsum board between their leg members and thereby hold in position to facilitate installation of the electrical box B. Each fastener 8 is, for example, stamped from a metal sheet and is provided with two coaxial holes such as 9 and 10 through its respective leg members. The two fasteners 8 are so positioned as to align their holes 9 and 10 with respective countersunk holes 11 and 12 bored through the flange 6.

The box-like wall structure is then inserted in the opening 7 from the front of the board G with a sealing compound applied between the back of the flange 6 and the front of the board G, as illustrated at 13 in FIG. 1 where the sealing compound overflows, which overflow is wiped. The sealing compound 13 is advantageously a silicone sealant.

Screws 14 and 15 are thereafter drived through the respective counter-sunk holes 11, 12, holes 9 and 10, and through the board G of gypsum, as illustrated in FIG. 3, in order to fixedly attach the box B on the board G. During this operation, the sealing compound 13 is pressed between the back of the flange 6 and the front of the board G to produce a tight joint between the flange 6 and the gypsum board G, impervious to aerial acoustic waves, even in the region of the holes 11 and 12 through the flange 6.

The installation of the electric cables on the box B is described hereinbelow. It can be appreciated that in most of the applications, it is necessary to mount the electric cables on the box B before fixing the latter on the gypsum board G as described above.

Apertures such as 16 and 17 are bored through the rear wall 5 close to the backward wall extension 2' of the bottom wall 2 (and/or close to the backward extension 4' of the top wall 4 as required). The box-like wall structure of the box B, of course excluding the backward extensions 2' and 4', is otherwise non perforated. The apertures 16 and 17 allow passage and therefore access to the interior of the box B of electrically conducting wires such as 18 and 19 of multiple wire electric cables 20 and 21, each comprising (a) three inner individual wires at least two of which are individually insulated and (b) an outer insulation covering the three inner conductors.

Before introducing the wires 18 and 19 through the apertures 16 and 17, the latter apertures are filled with a sealing compound 22 for example a silicone sealant and a suitable length of outer insulation is removed from the ends of the cables 20 and 21. The wires 18 and 19 are then slid from the back of the box B through their respective apertures 16 and 17 until the non removed outer insulation of the cables 20 and 21 reaches the latter apertures. The sealing compound accordingly surrounds individually the wires 18 and 19 to provide for better tightness to the aerial acoustic waves.

After the electric cables are in proper position, these cables 20 and 21 are attached to the backward wall projection 2' (FIG. 2) by means of a conventional L-shaped fastener 23 with a threaded hole 24. The fastener 23 is attached to the projection 2' by means of a bolt 25 traversing the latter projection and screwed in the hole 24. The projections 2' and 4' prevent boring of holes in the box-like wall structure to attach the electric cables 20 and 21 to the box B, which holes would allow transmission of aerial acoustic waves through the box.

Additional sealant 22 can also be added from the interior of the box B to complete sealing of the apertures 16 and 17.

As the sealant 22 tightly close the apertures 16 and 17, and the sealant 13 tightly seal the joint between the back of the flange 6 and the front of the board G, the box B tightly close to opening 7 to oppose to the passage of aerial acoustic waves across the wall.

Also, the electrical box B is fixed to the board G itself and accordingly cause no acoustic short circuit with the stud structure of the wall on which it is mounted. It is particularly important when the board G is acoustically insulated from such a stud structure as such a short circuit would allow direct transmission of acoustic vibrations from the box to the stud structure and vice versa, to thereby short circuit the acoustic insulation between the board G and stud structure.

Last of all, a domestic A.C. outlet or switch can be conventionally mounted in the box B by means of screws drived through holes such as 26 and 27 (FIG. 1), which outlet or switch is finally covered by an outlet or switch plate.

Although the present invention has been described hereinabove by way of a preferred embodiment thereof, it should be pointed out that modifications to such an embodiment, in particular in the shape of the box, can be carried out at will, within the scope of the appended claims, without departing from the nature and spirit of the subject invention.

What is claimed is:

1. In the combination of an electric box with a building wall or ceiling board having a front surface and an opening therein, said electric box comprising:
   (a) a box-like wall structure having an open face and comprising at least one aperture through which electrically conducting wires enter the electrical box;
   (b) means for attaching the said wires to the box-like structure; and
   (c) a planar flange extending outwardly around all of the open face of the box-like wall structure, said planar flange having a back surface and being so dimensioned as to extend over the front surface of the wall or ceiling board when said box-like wall structure is inserted into said board opening,
   the improvements wherein
   the box-like wall structure of said electric box is non perforated except for said at least one aperture; and
   said combination further comprises:
   (e) means for sealing said at least one aperture with the electrically conducting wires therein to prevent transmission of acoustic waves through the said at least one aperture of the box-like wall structure; and
   (f) fastener means for attaching the said electrical box directly on said board with the said flange and board overlapping each other around all of the board opening and with a sealing compound pressed between the box flange and said board around all of the board opening, fastener means comprising a plurality of fasteners U-shaped in cross-section and each defining two leg members with respective, coaxial holes, each U-shaped fastener being positioned on a corresponding edge of the board opening with the leg members thereof on opposite sides of the board, the fastener means further comprising screws each driven through the box flange, the said board and the coaxial holes of a corresponding one of said U-shaped fasteners, in order to fixedly attach the electrical box to the board while pressing the sealing compound between the back surface of the flange and the front surface of the board to form an acoustic wave-tight joint between said flange and said board;
   whereby said non-apertured box-like wall structure with each of said at least one aperture sealed by said sealing means and with said sealing compound pressed between said flange and said board around all of the board opening to form an acoustically insulating combination preventing the existence of direct structural acoustic short circuit.

2. The combination of claim 1, in which the box flange comprises holes bored therein and through which the said screws are drived.

3. The combination of claim 1, in which each of said fasteners is stamped from a sheet of steel.

4. The combination of a claim 1, wherein the said electrical box comprises at least one backward wall extension, and wherein said wire attaching means comprises a wire fastener mounted on said wall extension.

5. The combination of claim 1, wherein said aperture sealing means comprises a sealing compound.

6. The combination of claim 1, wherein said sealing compound comprises silicone.

7. The combination of claim 8, wherein the sealing compound of the said aperture sealing means includes silicone.

8. The combination of claim 1, wherein said flange is integral with the box-like wall structure to form a one-piece wall structure and flange manufactured through molding of plastic material.

9. A method of acoustically insulating an electrical box while mounting it on a building wall or ceiling board having a front surface and an opening therein, said electrical box comprising (a) a box-like wall structure having an open face and comprising at least one aperture through which electrically conducting wires enter the electrical box, said wall structure being otherwise non-perforated, (b) means for attaching the said wires to the box-like wall structure, and (c) a planar flange extending outwardly around all of the open face of the box-like wall structure, said planar flange having a back surface and being so dimensioned as to extend over the front surface of the wall or building board when said box-like wall structure is inserted into said board opening, the said acoustically insulating method comprising the steps of:
   overlapping the back surface of said flange with the front surface of said wall or ceiling board around all of the board opening and applying a sealing compound between said flange and board again around all of the board opening;
   fastening the flange of said electrical box directly on the said board while pressing the sealing compound between said flange and board whereby the said sealing compound forms an acoustic wave-tight joint between the said flange and board; and
   sealing the said at least one aperture of the box-like wall structure of the electrical box with the electrically conducting wires therein to prevent transmission of acoustic waves through the said aperture.

10. The method of claim 9, wherein the aperture sealing step comprises applying a sealing compound in the said aperture in the box-like wall structure.

11. The method of claim 10, wherein said electric wires form part of at least one electric cable with an outer insulation, said acoustically insulating method further comprising the step of removing the outer insulation of the portion of the electric cable entering the electrical box, whereby said sealing compound applied in the said aperture surrounds individually the electrically conducting wires.

12. The method of claim 9, wherein the aperture sealing step comprises applying a silicone sealant in the said aperture in the box-like wall structure.

* * * * *